United States Patent
Doke et al.

(10) Patent No.: US 12,242,974 B2
(45) Date of Patent: Mar. 4, 2025

(54) METHOD AND SYSTEM FOR SERVICE SYNTHESIS AND EVALUATION USING PATTERNS

(71) Applicant: Tata Consultancy Services Limited, Mumbai (IN)

(72) Inventors: Pankaj Doke, Thane (IN); Sujit Devkar, Thane (IN); Sylvan Lobo, Thane (IN); Karan Bhavsar, Thane (IN); Sujit Shinde, Thane (IN); Sanjay Kimbahune, Thane (IN); Akhilesh Srivastava, Thane (IN); Srinivasu Pappula, Hyderabad (IN); Harsh Vishwakarma, Hyderabad (IN); Bhaskar Pawar, Thane (IN); Rajesh Urkude, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 542 days.

(21) Appl. No.: 17/646,820

(22) Filed: Jan. 3, 2022

(65) Prior Publication Data
US 2022/0284308 A1    Sep. 8, 2022

(30) Foreign Application Priority Data
Feb. 16, 2021   (IN) .............................. 202121006520

(51) Int. Cl.
  G06N 5/01 (2023.01)
  G06F 18/2323 (2023.01)
  G06Q 10/0637 (2023.01)

(52) U.S. Cl.
  CPC .......... G06N 5/01 (2023.01); G06F 18/2323 (2023.01); G06Q 10/0637 (2013.01)

(58) Field of Classification Search
  CPC ...................................................... G06N 5/01
  (Continued)

(56) References Cited

U.S. PATENT DOCUMENTS

2006/0195463 A1*  8/2006  Bogner ................ G06Q 30/02
2014/0164048 A1*  6/2014  Bourdaillet ........ G06Q 10/0633
                                                    705/7.27
(Continued)

FOREIGN PATENT DOCUMENTS

JP   2003005969 A   1/2003
JP   2008059346 A   3/2008
JP   2019507985 A   3/2019

*Primary Examiner* — Austin Hicks
(74) *Attorney, Agent, or Firm* — FINNEGAN, HENDERSON, FARABOW, GARRETT & DUNNER LLP

(57) ABSTRACT

A method and system that allows on-the-fly synthesis and evaluation of services a scale has been provided. The method and system provide a mechanism where the service offering and their price points are accessible in a machine format and allow themselves to be lent to synthesize new service offerings with budgetary constraints, within the parameters of the predefined time windows. The system allows both a service provider and a service consumer to use a shared screen environment for service synthesis and valuation with the service provider playing the role of navigator. The system comprises of re-routing and navigating a plurality of nodes in the service composition graphs based on specified optimization parameters as chosen by the service consumer and tuned by the service provider. The method comprises of generation of the graph and graph traversal algorithms for along with service composition nodes and their specifications.

5 Claims, 4 Drawing Sheets

(58) Field of Classification Search
USPC .......................................................... 706/45
See application file for complete search history.

(56) References Cited

U.S. PATENT DOCUMENTS

2016/0217054 A1* 7/2016 Hadar .................... G06F 11/008
2021/0383489 A1* 12/2021 Hutchinson ............. G06F 16/29

* cited by examiner

METHOD AND SYSTEM FOR SERVICE SYNTHESIS AND EVALUATION USING PATTERNS

PRIORITY CLAIM

This U.S. patent application claims priority under 35 U.S.C. § 119 to: India Application No. 202121006520, filed on Feb. 16, 2021. The entire contents of the aforementioned application are incorporated herein by reference.

TECHNICAL FIELD

The disclosure herein generally relates to the field of service industry, and more specifically, to a method and system for on-the-fly pattern based synthesis and evaluation of services at scale.

BACKGROUND

Service industry is one of the dominant sector in India. The service industry is very dynamic and growing rapidly. With a huge competition involved in the service industry, the focus of a service provider is always on to provide additional benefits to a service consumer. The benefit could be provided in various ways such as enhancing the overall service experience, providing additional services etc. In the current scenario, there are a lot of service consumers who are involved in multiple service industries.

The service experience indices are not maintained or managed by the service providers. Even in the case where they do have it, the synthesis of service experience is manual. This is further deteriorated under time bound pressures. Even if a human is able to do it, it is sub optimal and not scalable, it may not be consistent always. Further to arrive at an optimal service experience, economic constraints also need to meet within a predefined time manner.

Fundamental problem in the service industry is that the services are intangible and price negotiation and discovery happen over intangible artifact which has not yet been created and is difficult to create due to human involvement. Hence arriving at a valuation of a symphony of constituent service elements in a desirable configurations is challenging.

SUMMARY

Embodiments of the present disclosure present technological improvements as solutions to one or more of the above-mentioned technical problems recognized by the inventors in conventional systems. For example, in one embodiment, a method for pattern based synthesis and evaluation of services is provided. The system comprises an input/output interface, one or more hardware processors and a memory. The input/output interface provides a set of requirements by a service consumer as an input. The memory is in communication with the one or more hardware processors, the memory further configured to perform the steps of: creating a plurality of notes based on the set of requirements, wherein the plurality of notes are a set of service offerings provided by one or more service providers, wherein the set of requirements and the set of service offerings are from a plurality of domains; constructing a plurality of nodes using at least three notes out of the plurality of notes; generating a plurality of pattern languages using the constructed plurality of nodes through a first relation, wherein the first relation is provided by the user; creating a language graph by connecting the plurality of pattern languages to through a second relation, wherein the second relation is provided by the user; generating a meta-graph using the language graph, wherein the meta-graph comprises inter-domain information of domains out of the plurality of domains; traversing with heuristic through the plurality of nodes present in the meta-graph to generate an output of a plurality of services; traversing for cost evaluation in the meta-graph, wherein each of the plurality of nodes have a cost associated therein, wherein the traversing results in generation of a plausible cost budget estimate; traversing for time evaluation in the meta-graph to generate a time limit; and generating a set of services out of the plurality of novel services based on the plausible cost budget estimate and the time limit using a breadth first search algorithm, wherein the set of services are generated within a predefined time constraint.

In another aspect, a method for pattern based synthesis and evaluation of services is provided. Initially a set of requirements is provided by a service consumer as an input. Further a plurality of notes is created based on the set of requirements, wherein the plurality of notes are a set of service offerings provided by one or more service providers, wherein the set of requirements and the set of service offerings are from a plurality of domains. In the next step, a plurality of nodes is constructed using at least three notes out of the plurality of notes. Further a plurality of pattern languages is generated using the constructed plurality of nodes through a first relation, wherein the first relation is provided by the user. Further a language graph is created by connecting the plurality of pattern languages to through a second relation, wherein the second relation is provided by the user. In the next step, a meta-graph is generated using the language graph, wherein the meta-graph comprises inter-domain information of domains out of the plurality of domains. Further, traversed with heuristic through the plurality of nodes present in the meta-graph to generate an output of a plurality of services. In the next step, traversed for cost evaluation in the meta-graph, wherein each of the plurality of nodes have a cost associated therein, wherein the traversing results in generation of a plausible cost budget estimate. Similarly, then traversed for time evaluation in the meta-graph to generate a time limit. And finally, a set of services is generated out of the plurality of novel services based on the plausible cost budget estimate and the time limit using a breadth first search algorithm, wherein the set of services are generated within a predefined time constraint.

In yet another aspect, one or more non-transitory machine-readable information storage mediums comprising one or more instructions which when executed by one or more hardware processors cause pattern based synthesis and evaluation of services. Initially a set of requirements is provided by a service consumer as an input. Further a plurality of notes is created based on the set of requirements, wherein the plurality of notes are a set of service offerings provided by one or more service providers, wherein the set of requirements and the set of service offerings are from a plurality of domains. In the next step, a plurality of nodes is constructed using at least three notes out of the plurality of notes. Further a plurality of pattern languages is generated using the constructed plurality of nodes through a first relation, wherein the first relation is provided by the user. Further a language graph is created by connecting the plurality of pattern languages to through a second relation, wherein the second relation is provided by the user. In the next step, a meta-graph is generated using the language graph, wherein the meta-graph comprises inter-domain information of domains out of the plurality of domains.

Further, traversed with heuristic through the plurality of nodes present in the meta-graph to generate an output of a plurality of services. In the next step, traversed for cost evaluation in the meta-graph, wherein each of the plurality of nodes have a cost associated therein, wherein the traversing results in generation of a plausible cost budget estimate. Similarly, then traversed for time evaluation in the meta-graph to generate a time limit. And finally, a set of services is generated out of the plurality of novel services based on the plausible cost budget estimate and the time limit using a breadth first search algorithm, wherein the set of services are generated within a predefined time constraint.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
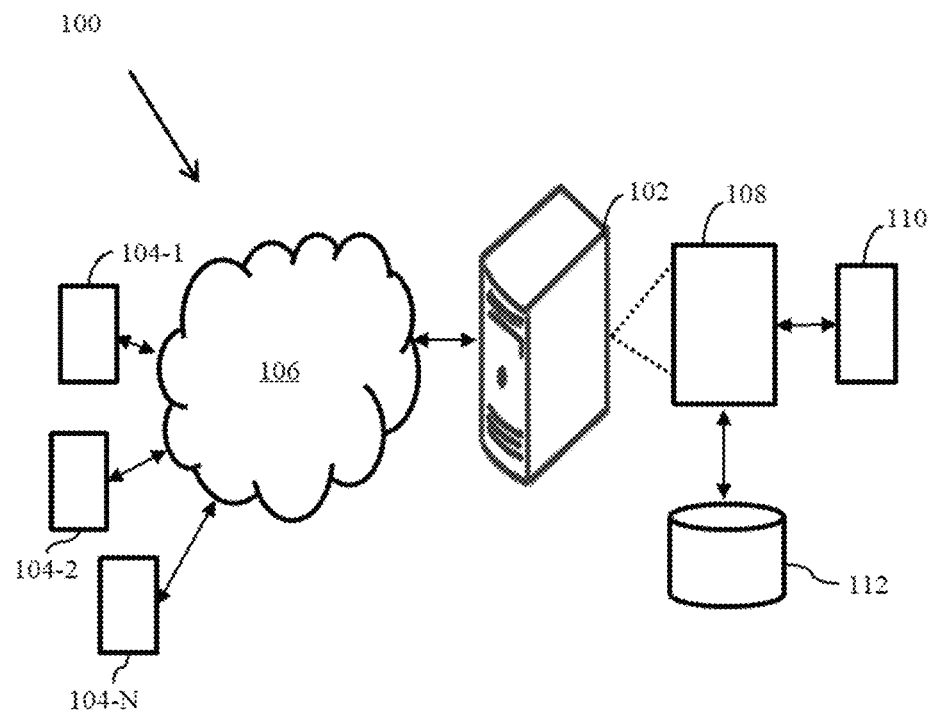
FIG. 1 illustrates an exemplary block diagram of a system for pattern based synthesis and evaluation of services according to some embodiments of the present disclosure.
Figure 2:
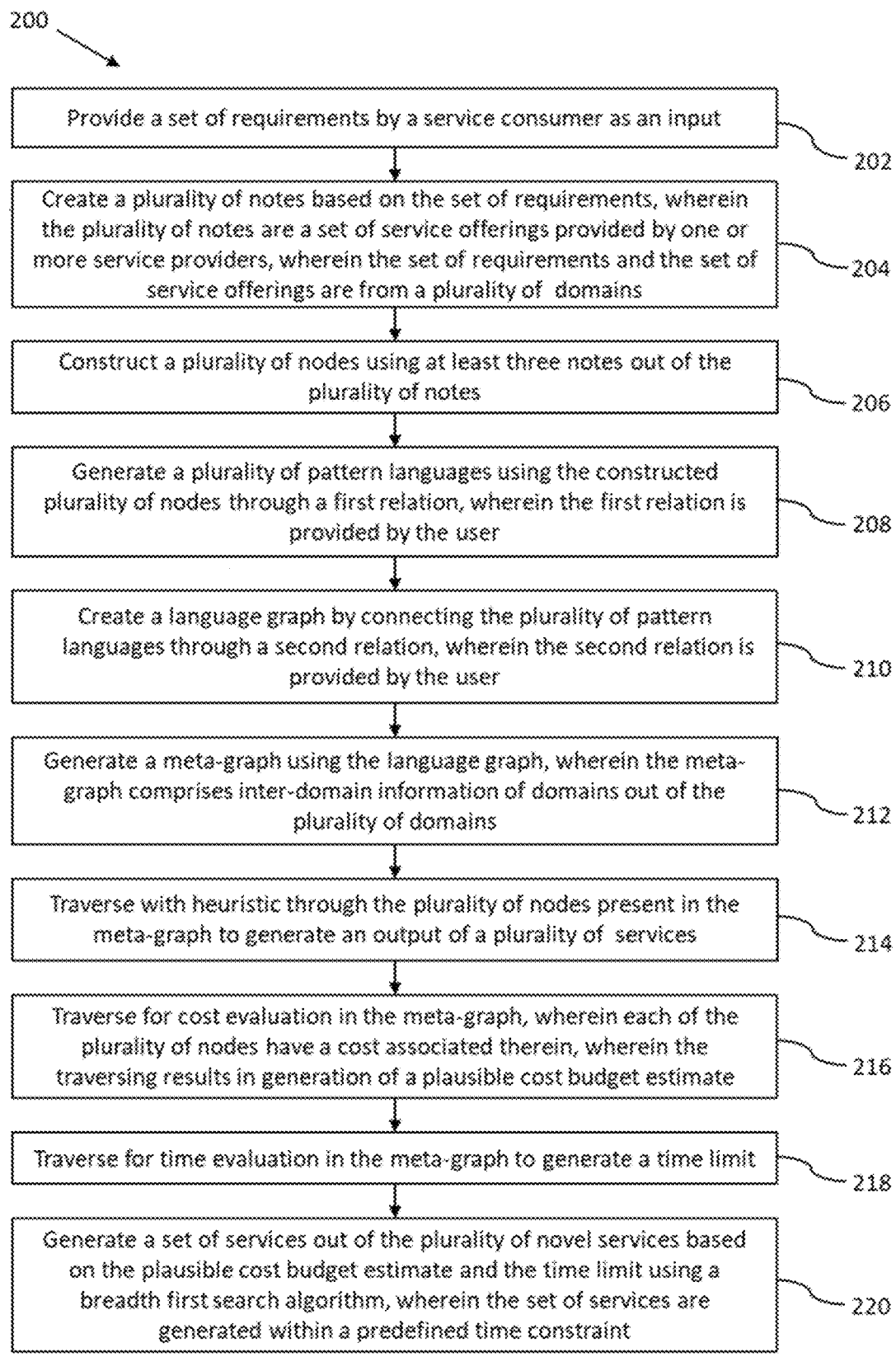
FIG. 2 is a flow diagram illustrating a method for pattern based synthesis and evaluation of services in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The service providers normally deal with big service consumers who have foothold in multiple services. Thus, if the service provider is interacting with the service consumer in regard to one of the service area, there is always a possibility to provide services to the same service consumer in other service areas as well. One of the challenges service providers face is proposing new business service offering which can be enabled for the service consumers. In addition, the service consumer expects that the service provider suggests new services within budgetary constraints, with minor deviations (sigma, 2 sigma).

The existing methods for generation of new services are manual services and require a lot of time. It is almost impossible to generate, suggest or evaluate a new service in a short span of time as less as about 30-120 minutes. Even if the service provider generates and suggest new options, the service consumer invariably brings a little variant and asks for something novel and unexplored, yet viable from a finance perspective. In such scenarios, everything then depends on the experience of the subject matter experts from the service providers.

The manual process used by the service provider is clearly not scaling. The service provider is not able to suggest new service offerings to the service consumer in the small time window they have. Where they can come with their budgetary allocations and then negotiate on the variations in the services or budget and conclude the deal.

An embodiment provides a technical solution to the above technical problem by proposing a method and system that allows on-the-fly synthesis and evaluation of services at scale. The method and system provides a mechanism where the service offering and their price points are accessible in a machine format and allow themselves to be lent to synthesize new service offerings with budgetary constraints, within the parameters of the predefined time windows.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

According to an embodiment of the disclosure, the block diagram of a system 100 for pattern based synthesis and evaluation of services is shown in FIG. 1. The system 100 is configured to generate just-in-time one or more new services on the fly. The system 100 allows both a service provider and a service consumer to use a shared screen environment for service synthesis and valuation with the service provider playing the role of navigator. The system 100 comprises of re-routing and navigating a plurality of nodes in the service composition graphs based on specified optimization parameters as chosen by the service consumer and tuned by the service provider. The method comprises of generation of the graph and graph traversal algorithms for along with service composition nodes and their specifications.

It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

The system 100 is configured to drill down and drill up for service construction and deconstruction in an intuitive manner. Various curated design patterns and languages are combined with computational mechanisms and graphs for intangible service discovery.

In operation, a method for pattern based synthesis and evaluation of services is shown in the flowchart of FIG. 200. The steps of the method 200 will now be explained in detail with reference to the components of the system 100 (of FIG. 1) and FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Initially at step 202 the set of requirements are provided by the service consumer as an input. At step 204, a plurality of notes are created based on the set of requirements. The plurality of notes are a set of service offerings provided by the one or more service providers. The set of requirements and the set of service offerings are from a plurality of domains. The plurality of domains are the fields of service industry related to the field of the service consumer. A domain can have multiple pattern languages.

At step 206, a plurality of nodes are constructed using at least three notes out of the plurality of notes. The plurality of nodes captures the abstract solution and the problem of the set of requirements provided by the service consumer by combining the three or more plurality of notes. The plurality of nodes also captures the pricing/costing and return of investment (ROI) by combining the three or more plurality of notes. The plurality of notes is concrete example of the solutions which is mentioned in abstract form in the nodes. Since the notes are concrete examples they have pricing and time values for the solution. Using three notes, the user can get an average (with standard deviation) values of the associated cost and time—which is captured in the design pattern.

The plurality of nodes are strongly connected graph and connections are based on ontologies which are machine processed from the notes in the node. For example: If the node has the note called "IT Services" with a textual description which says 'IT Services need customer support' then using NLP/ontology the program establishes a connection to the "BPO services" node. Thus all the nodes are machine connected automatically based on NLP techniques operating on the textual description of the nodes.

At step 208, a plurality of pattern languages is generated using the constructed plurality of nodes through a first relation, wherein the first relation is provided by the user. The first relation is defined by a function R. The function R is chosen by the service provider, a domain expert or a subject matter expert. The existing quality and non-quality services are deconstructed in to one or many patterns and anti-patterns. Patterns and anti-patterns are then connected in to a graph by the service provider. Given a set of nodes, which are connected and can be navigated any to any, only those navigations are chosen which are connected by the ontological/hashtag words limited by a distance of two.

At step 210, a language graph is created by connecting the plurality of pattern languages to through a second relation, wherein the second relation is provided by the user. The second relation is defined by a function LR. The function LR is chosen by the service provider, a domain expert or a subject matter expert. The language graph is specific to domain.

The domain problem do not exist in isolation, all the solutions are linked—hence at the top level (abstract) the patterns (nodes) are connected in the language graph. Since domains do not exist in isolation in real world—the plurality of pattern languages are connected. This is called a forest of graphs. The language graphs from each domain are connected. The system 100 is further configured to show a visual depictions of the forest of graphs which is better perceived by human—since human think in visual cognition and find it difficult to think in terms of absolute data points.

At step 212, a meta-graph is generated using the language graph. The meta-graph comprises inter-domain information of domains out of the plurality of domains.

Further at step 214, an output of a plurality of novel services is generated traversing with heuristics through the plurality of nodes present in the meta-graph. This traversal occurs along the node level. Similarly, at step 216, a plausible cost budget estimate is generated by traversing for cost evaluation in the meta-graph. Each of the plurality of nodes have a cost associated therein. This traversal occurs along the language level. Further at step 218 a time limit is also generated by traversing for time evaluation in the meta-graph to generate a time limit.

And finally at step 220, a set of services out of the plurality of novel services is generated based on the plausible cost budget estimate and the time limit using a breadth first search algorithm, wherein the set of services are generated within a predefined time constraint. The set of services are then suggested to the service consumer. Service synthesis is based on interpretation of the traversal of the nodes in the graph based on the interpretation of the requirements of the service customer by the service provider.

Figure 3:
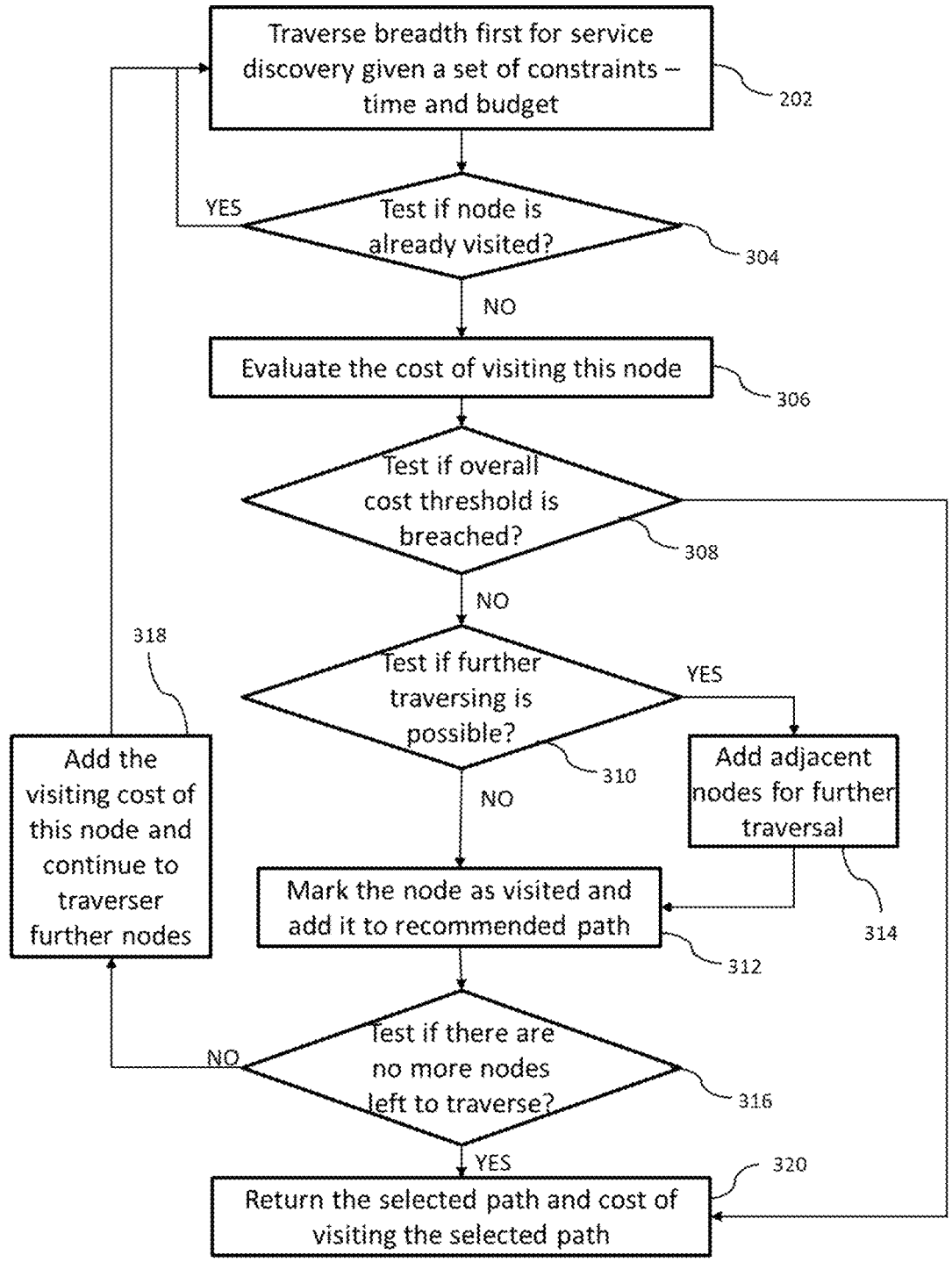
FIG. 3 is flowchart illustrating a method for implementing breadth first search algorithm according to an embodiment of the present disclosure.

A flowchart 300 explaining the steps involved in the breadth first search (BFS) algorithm are shown in the flowchart of FIG. 3. At step 302, in the BFS algorithm, it is traversed along the breadth first for service discovery given a set of constraints—time and the plausible cost budget estimate. At step 304, it is checked if a particular node is already visited or not. If yes, then the step 302 is performed again. If no, then at step 306, the cost of visiting the particular node is evaluated.

At step 308, it is tested that if overall cost threshold is breached or not. If no then at step 310, it is tested if further traversing is possible or not. If no then at step 312, the node is marked as visited and the node is added to the recommended path. If yes then at step 314, the adjacent nodes are added for further traversal. At step 316, it is tested if there are no more nodes left for traversal. If no more nodes, then at step 318, the visiting cost of this node is added and the method continues to traverser further nodes. And finally if no then at step 320, the selected path and cost of visiting the selected path is returned.

The domain can have multiple pattern languages. Each traversal generates an ordered set of nodes. The new service discovery can also happen within a domain by taking a path which is not yet traversed. The computation is achieved by cross-linking the domain graphs (and their connected pattern language graphs).

According to an embodiment of the disclosure, the system 100 also comprises the input/output interface 104. The input/output interface 104 is configured to display new service offerings along with the exact service landscaping customer journey maps. Further, the service consumer can visualize how they can introduce novel features into those based on the line of business. The input/output interface 104 also comprises a cost meter next to the offerings, which can be operated by the service consumer. The service consumer can see the extra potential offerings which can be plumbed for increase in investments. The service consumer can also visualize the increase or decrease in the service offered and the budget auto adjusted. Further, based on various selection made by the service consumer, a Customer Journey Map (CJM) can also be created and displayed on the input/output interface 104.

Figure 4:
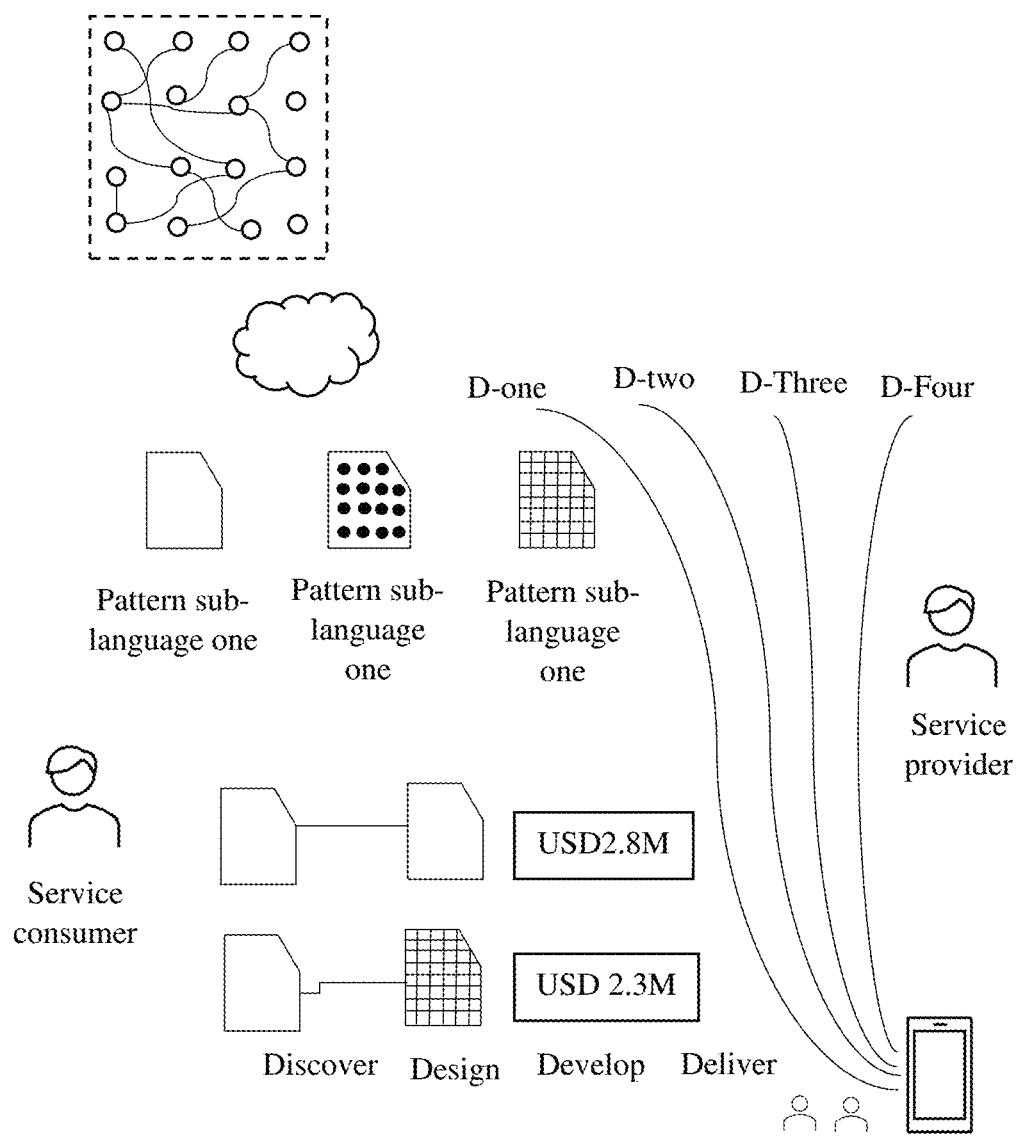
FIG. 4 is a schematic diagram representing a visual thinking aid of the system for pattern based synthesis and evaluation of services according to some embodiments of the present disclosure.

FIG. 4 shows a schematic representation of the visual thinking aid of the system 100 for pattern based synthesis and evaluation of services. The Visual Thinking Aid (VTA) depicts the Discover-Design-Develop-Deliver automation system between the service provider and the service consumer. The discover stage depicts the existing service offerings of the service provider as well as various industry players and cross-industry players. The visual aid helps in an automated and fast service discovery as compared to humans at scale within a specified time constraint.

The design stage of the VTA lets the service provider and the service consumer co-create service based on their business goals and budgets (time and resource). The develop stage then takes the design and helps the service provider and the service consumer further detail the service to be offered as an instantiation of the pattern/pattern language. The last stage, deliver stage generates a service blueprint document. This document can then be used by a model based tool/product to further process and build the system components in an automated way.

The VTA can be either operated synchronously via a desktop web application/browser instance or asynchronously via a mobile application which pairs the service provider and the service consumer. The FIG. 4 depicts how various domains (D1: Domain1: BFS, D2: Domain2: TTH, D3: Domain3: HealthCare, etc.) can be used in tandem with their respective domain pattern languages {D1: sub-pattern-language-one, D2: sub-pattern-language-one, D3: sub-pattern-language-one} to synthesize a new offering in the domains of interest to the service provider.

The FIG. 4 also depicts that having instantiated a particular design with a budget of say USD 2.3M, the VTA can help discover additional services or embellish the existing service if the budget were to increase to say USD 2.8M. Thus, the VTA allows as the system to synthesis new services as evaluate the economics of such a service, just in time and at scale.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of effectively generating/suggesting new services in a limited period of time. The embodiment, thus provides method and system for on-the-fly pattern based synthesis and evaluation of services at scale It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for pattern based synthesis and evaluation of services, comprising:
   providing, via one or more hardware processors, a set of requirements by a service consumer as an input;
   creating, via the one or more hardware processors, a plurality of notes based on the set of requirements, wherein the plurality of notes are a set of service offerings provided by one or more service providers, wherein the set of requirements and the set of service offerings are associated with a plurality of domains;
   constructing, via the one or more hardware processors, a plurality of nodes using at least three notes out of the plurality of notes;
   generating, via the one or more hardware processors, a plurality of pattern languages using the constructed plurality of nodes through a first relation, wherein the first relation is provided by a user;
   creating, via the one or more hardware processors, a language graph by connecting the plurality of pattern languages through a second relation, wherein the second relation is provided by the user;
   generating, via the one or more hardware processors, a meta-graph using the language graph, wherein the meta-graph comprises inter-domain information of a domain of the plurality of domains;
   traversing the meta-graph heuristically along a node level of the meta-graph, via the one or more hardware processors, through the plurality of nodes present in the meta-graph to generate an output of a plurality of services, wherein the plurality of services are generated by:
      deconstructing the plurality of nodes present in the meta-graph into one or more patterns and one or more anti-patterns;
   traversing the meta-graph, along a language level via the one or more hardware processors, for cost evaluation in the meta-graph, wherein each of the plurality of nodes have a cost associated therein, wherein the traversing results in generation of a plausible cost budget estimate;
   traversing the meta-graph, via the one or more hardware processors, for time evaluation in the meta-graph to generate a time limit; and
   generating, via the one or more hardware processors, a set of services out of the plurality of services based on the plausible cost budget estimate and the time limit using a breadth first search algorithm, wherein the set of services are generated within a predefined time constraint, wherein executing the breadth first search algorithm includes:
      traversing the meta-graph along the breadth first for service discovery for a given set of constraints and the plausible cost budget estimate;
      determining whether a particular node of the plurality of nodes is visited;
      evaluating, based on the determination, a cost of visiting the particular node; and
      determining, based on the evaluation, whether an overall cost has breached a threshold cost;
   synthesizing, via the one or more hardware processors, the generated set of services based on interpretation of the nodes in the meta-graph and interpretation of the set of requirements;
   visualizing, via the one or more hardware processors, the set of services of a plurality of features in the set of service offerings by auto-adjusting the plausible cost budget;
   displaying, via input/output interface coupled with the one or more hardware processors, a plurality of new service offerings which are operated by the service consumer, wherein the plurality of new service offerings are displayed based on the visualization of the set of services, and
   the input/output interface further comprises:
      a cost meter next to the plurality of new service offerings,
      a plurality of extra potential offerings which can be plumbed for increase in investments, and
      an increase or a decrease in the service offered and the auto adjustment of the plausible cost budget;
   creating, via the one or more hardware processors, a customer journey map (CJM), wherein the creation of the CJM is based on a plurality of selections on the displayed plurality of new service offerings, and the created CJM is displayed on the input/output interface; and
   representing, via the input/output interface coupled with the one or more hardware processors, a Visual Thinking Aid (VTA) for the pattern based synthesis and evaluation of services, wherein the VTA depicts a Discover-Design-Develop-Deliver automation system between the service provider and the service consumer,
   the VTA includes a discover stage, a design stage, a develop stage, and a deliver stage,
   the discover stage of the VTA depicts at least one of existing service offerings of the service provider, one or more industry players, and one or more cross-industry players, the design stage of the VTA enables the service provider and the service consumer to co-create the set of services based on one or more inputs, the develop stage receives designs from the design stage and outputs the CJM, the deliver stage generates a service blueprint document, and the generated service blueprint document is used to create one or more system components in an automated manner.

2. The method of claim 1, wherein the language graph is specific to a domain out of the plurality of domain.

3. A system for pattern based synthesis and evaluation of services, the system comprises:

an input/output interface for providing a set of requirements by a service consumer as an input;

one or more hardware processors; and a memory in communication with the one or more hardware processors, the processor further configured to perform the steps of:

creating a plurality of notes based on the set of requirements, wherein the plurality of notes are a set of service offerings provided by one or more service providers, wherein the set of requirements and the set of service offerings are associated with a plurality of domains;

constructing a plurality of nodes using at least three notes out of the plurality of notes;

generating a plurality of pattern languages using the constructed plurality of nodes through a first relation, wherein the first relation is provided by a user;

creating a language graph by connecting the plurality of pattern languages to through a second relation, wherein the second relation is provided by the user;

generating a meta-graph using the language graph, wherein the meta-graph comprises inter-domain information of a domain of the plurality of domains;

traversing the meta-graph heuristically along a node level of the meta-graph through the plurality of nodes present in the meta-graph to generate an output of a plurality of services, wherein the plurality of services are generated by:

deconstructing the plurality of nodes present in the meta-graph into one or more patterns and one or more anti-patterns;

traversing the meta-graph along a language level for cost evaluation in the meta-graph, wherein each of the plurality of nodes have a cost associated therein, wherein the traversing results in generation of a plausible cost budget estimate;

traversing the meta-graph for time evaluation in the meta-graph to generate a time limit; and generating a set of services out of the plurality of novel services based on the plausible cost budget estimate and the time limit using a breadth first search algorithm, wherein the set of services are generated within a predefined time constraint, wherein executing the breadth first search algorithm includes:

traversing the meta-graph along the breadth first for service discovery for a given set of constraints and the plausible cost budget estimate;

determining whether a particular node of the plurality of nodes is visited;

evaluating, based on the determination, a cost of visiting the particular node; and determining, based on the evaluation, whether an overall cost has breached a threshold cost;

synthesizing the generated set of services based on interpretation of the nodes in the meta-graph and interpretation of the set of requirements;

visualizing the set of services of a plurality of features in the set of service offerings by auto-adjusting the plausible cost budget;

displaying via input/output interface, a plurality of new service offerings which are operated by the service consumer, wherein the plurality of new service offerings are displayed based on the visualization of the set of services, and the input/output interface further comprises:

a cost meter next to the plurality of new service offerings, a plurality of extra potential offerings which can be plumbed for increase in investments, and an increase or a decrease in the service offered and the auto adjustment of the plausible cost budget;

creating a customer journey map (CJM), wherein the creation of the CJM is based on a plurality of selections on the displayed plurality of new service offerings, and the created CJM is displayed on the input/output interface; and representing via the input/output interface, a Visual Thinking Aid (VTA) for the pattern based synthesis and evaluation of services, wherein the VTA depicts a Discover-Design-Develop-Deliver automation system between the service provider and the service consumer, the VTA includes a discover stage, a design stage, a develop stage, and a deliver stage, the discover stage of the VTA depicts at least one of existing service offerings of the service provider, one or more industry players, and one or more cross-industry players, the design stage of the VTA enables the service provider and the service consumer to co-create the set of services based on one or more inputs, the develop stage receives designs from the design stage and outputs the CJM, the deliver stage generates a service blueprint document, and the generated service blueprint document is used to create one or more system components in an automated manner.

4. The system of claim 3, wherein the language graph is specific to a domain out of the plurality of domains.

5. One or more non-transitory machine-readable information storage mediums comprising one or more instructions which when executed by one or more hardware processors cause:

providing a set of requirements by a service consumer as an input;

creating a plurality of notes based on the set of requirements, wherein the plurality of notes are a set of service offerings provided by one or more service providers, wherein the set of requirements and the set of service offerings are associated with a plurality of domains;

constructing a plurality of nodes using at least three notes out of the plurality of notes;

generating a plurality of pattern languages using the constructed plurality of nodes through a first relation, wherein the first relation is provided by a user;

creating a language graph by connecting the plurality of pattern languages through a second relation, wherein the second relation is provided by the user;

generating a meta-graph using the language graph, wherein the meta-graph comprises inter-domain information of a domain of the plurality of domains;

traversing the meta-graph heuristically along a node level of the meta-graph through the plurality of nodes present in the meta-graph to generate an output of a plurality of services, wherein the plurality of services are generated by:

deconstructing the plurality of nodes present in the meta-graph into one or more patterns and one or more anti-patterns;

traversing the meta-graph along a language level for cost evaluation in the meta-graph, wherein each of the plurality of nodes have a cost associated therein, wherein the traversing results in generation of a plausible cost budget estimate;

traversing the meta-graph for time evaluation in the meta-graph to generate a time limit; and generating a set of services out of the plurality of novel services based on the plausible cost budget estimate and the time limit using a breadth first search algorithm, wherein the set of services are generated within a predefined time constraint, wherein executing the breadth first search algorithm includes:

traversing the meta-graph along the breadth first for service discovery for a given set of constraints and the plausible cost budget estimate;

determining whether a particular node of the plurality of nodes is visited;

evaluating, based on the determination, a cost of visiting the particular node; and determining, based on the evaluation, whether an overall cost has breached a threshold cost;

synthesizing the generated set of services based on interpretation of the nodes in the meta-graph and interpretation of the set of requirements;

visualizing the set of services of a plurality of features in the set of service offerings by auto-adjusting the plausible cost budget;

displaying via input/output interface, a plurality of new service offerings which are operated by the service consumer, wherein the plurality of new service offerings are displayed based on the visualization of the set of services, and the input/output interface further comprises:
 a cost meter next to the plurality of new service offerings,
 a plurality of extra potential offerings which can be plumbed for increase in investments, and
 an increase or a decrease in the service offered and the auto adjustment of the plausible cost budget;

creating a customer journey map (CJM), wherein the creation of the CJM is based on a plurality of selections on the displayed plurality of new service offerings, and the created CJM is displayed on the input/output interface; and representing via the input/output interface, a Visual Thinking Aid (VTA) for the pattern based synthesis and evaluation of services, wherein
 the VTA depicts a Discover-Design-Develop-Deliver automation system between the service provider and the service consumer,
 the VTA includes a discover stage, a design stage, a develop stage, and a deliver stage,
 the discover stage of the VTA depicts at least one of existing service offerings of the service provider, one or more industry players, and one or more cross-industry players,
 the design stage of the VTA enables the service provider and the service consumer to co-create the set of services based on one or more inputs,
 the develop stage receives designs from the design stage and outputs the CJM,
 the deliver stage generates a service blueprint document, and
 the generated service blueprint document is used to create one or more system components in an automated manner.

\* \* \* \* \*